(12) United States Patent
Deiss et al.

(10) Patent No.: US 6,522,363 B1
(45) Date of Patent: Feb. 18, 2003

(54) DISPLAY FRAME RATE ADAPTATION

(75) Inventors: Michael Scott Deiss, Zionsville, IN (US); Andrew Kent Flickner, Carmel, IN (US)

(73) Assignee: Thomson Licensing S.A., Boulogne (FR)

(*) Notice: Subject to any disclaimer, the term of this patent is extended or adjusted under 35 U.S.C. 154(b) by 307 days.

(21) Appl. No.: 09/602,716

(22) Filed: Jun. 26, 2000

Related U.S. Application Data
(60) Provisional application No. 60/146,459, filed on Jul. 30, 1999.

(51) Int. Cl.[7] .................................................. H04N 11/20
(52) U.S. Cl. ...................................... 348/459; 348/443
(58) Field of Search ................................ 348/459, 443, 348/444, 441, 458, 554, 555, 558, 547; H04N 7/01, 11/20

(56) References Cited

U.S. PATENT DOCUMENTS

| | | | | |
|---|---|---|---|---|
| 4,831,441 A | * | 5/1989 | Ando | 348/441 |
| 5,508,747 A | * | 4/1996 | Lee | 348/441 |
| 5,734,435 A | * | 3/1998 | Wilson et al. | 348/443 |
| 6,028,639 A | * | 2/2000 | Bhatt et al. | 348/441 |

FOREIGN PATENT DOCUMENTS

EP        0779741        6/1997

* cited by examiner

*Primary Examiner*—Michael H. Lee
(74) *Attorney, Agent, or Firm*—Joseph S. Tripoli; Harvey D. Fried; Joseph J. Kolodka (57) ABSTRACT

An inventive method for adapting a display frame rate in a receiver to a picture frame rate of a received signal includes the steps of comparing a picture frame rate of a received signal with a display frame of a receiver, adjusting lines per field or lines per frame displayed in response to the comparing step, and generating a display frame rate control signal for the receiver in response to the adjusting step.

22 Claims, 7 Drawing Sheets

| 601 | DISPLAY RATE: 1920 x 1080I @ 30 FPS (AVG) | | | | | | | | | | |
|---|---|---|---|---|---|---|---|---|---|---|---|
| | FIELD NUMBER | 1 | 2 | 3 | 4 | 5 | 6 | 7 | 8 | 9 | 10 | ... |
| | TOTAL LINES PER FIELD | 562.5 | 562.5 | 562.5 | 562.5 | 563.5 | 562.5 | 562.5 | 562.5 | 561.5 | 562.5 | ... |

| 602 | DISPLAY RATE: 1920 x 1080I @ 29.97 (AVG) | | | | | | | | | | |
|---|---|---|---|---|---|---|---|---|---|---|---|
| | FIELD NUMBER | 1 | 2 | 3 | 4 | 5 | 6 | 7 | 8 | 9 | 10 | ... |
| | TOTAL LINES PER FIELD | 563.5 | 562.5 | 563.5 | 562.5 | 563.5 | 562.5 | 563.5 | 563.5 | 562.5 | 563.5 | ... |

| 603 | DISPLAY RATE: 1920 x 540P @ 60 FPS | | | | | | | | | | |
|---|---|---|---|---|---|---|---|---|---|---|---|
| | FIELD NUMBER | 1 | 2 | 3 | 4 | 5 | 6 | 7 | 8 | 9 | 10 | ... |
| | TOTAL LINES PER FIELD | 562 | 563 | 562 | 563 | 563 | 563 | 562 | 562 | 562 | 563 | ... |

| 604 | DISPLAY RATE: 1920 x 540P @ 59.94 FPS | | | | | | | | | | |
|---|---|---|---|---|---|---|---|---|---|---|---|
| | FIELD NUMBER | 1 | 2 | 3 | 4 | 5 | 6 | 7 | 8 | 9 | 10 | ... |
| | TOTAL LINES PER FIELD | 563 | 563 | 563 | 563 | 563 | 563 | 563 | 564 | 563 | 563 | ... |

DISPLAY FRAME RATE ADAPTATION

This application claims the benefit of U. S. Provisional Application No. 60/146,459, filed Jul. 30, 1999, entitled LINE DITHERING FRAME RATE CONTROL WITH DC COUPLED AND CONSTANT SLOPE RAMP VERTICAL DEFLECTION SYSTEM.

BACKGROUND

The present invention relates generally to television receivers, and more specifically to display frame rate adaptation in a DC coupled and constant slope ramp vertical deflection system.

Figure 1:
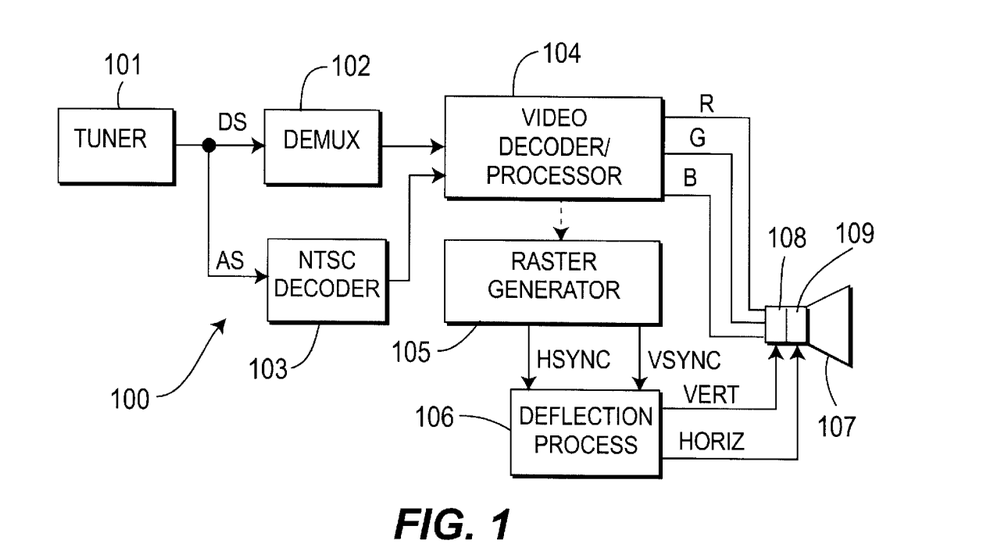
FIG. 1 is a system block diagram for an exemplary TV receiver for both digital and analog video signals.

FIG. 1 is a system block diagram 100 of an exemplary TV receiver for processing analog or digital format signals. Operation of the receiver 100 will be discussed in the context of National Television Systems Committee (NTSC) and Advanced Television Systems Committee (ATSC) signal standards. However, practice of the inventive aspects laid out herein are not limited to NTSC and ATSC signal standards. Out of the tuner 100, a digital signal DS is fed to a de-multiplexor 102, a known type of digital decoder, which sends a selected video signal to a video decoder 104 that provides red R, green G and blue B color component signals to the picture tube 107. An analog signal AS received from the tuner 101 is fed to an NTSC decoder 104 to provide a selective video signal for further video processing 104, which provides R, G and B color component signals to the picture tube 107. The NTSC signal out of the decoder 103 to the video decoder/processor 104 is format converted from 540P progressive active lines. Horizontal and vertical synchronization signals Hsync and Vsync are generated by a raster generator 105 in response to the video decoding or processing 104. The synchronization signals are then fed to a deflection process 106 that provides vertical and horizontal deflection signals Vert and Horiz to drive deflection coils 108, 109.

Generally, the raster generator 105 must be synchronized to the received signal so that picture frames are displayed at the same rate in which they were transmitted with the video signal. Dropping or repeating of frames is undesirable for the portrayal of motion by quality TV receivers. A reasonable way must be identified for a TV receiver to track the incoming frames to avoid generation of temporal artifacts. There are 18 picture scanning formats and frame rates supported by the ATSC standard, based on frame rates of 60 Hz, 30 Hz and 24 Hz. However, if the NTSC friendly rates of 59.94 Hz, 29.97 Hz and 23.97 Hz are considered, which will permit video reception of NTSC signals during the simulcast period of both ATSC and NTSC, then there are a total of 36 picture formats. Given the number of ATSC picture formats alone, tracking the incoming video picture frame frequency becomes difficult when the objective is a TV deflection system design optimized to work over a narrow range of frequencies.

SUMMARY OF THE INVENTION

An inventive method for adapting a display frame rate in a receiver to a picture frame rate of a received signal includes the steps of comparing a picture frame rate of a received signal with a display frame f a receiver, adjusting lines per field or lines per frame displayed in response to the comparing step, and generating a display frame rate control signal for the receiver in response to the adjusting step.

An inventive receiver for adapting a display frame rate to a picture frame rate of a received signal includes a DC coupled and constant slope ramp vertical deflection system, a signal decoder for a received signal that provides a first signal for video processing to drive a display tube and a second signal indicative of a picture frame rate of the received signal, and a comparator for comparing the second signal with a timing signal indicative of a display frame rate for the receiver. The receiver further includes means for adjusting lines per field or lines per frame displayed by the receiver in response to the comparator, and a raster generator for providing horizontal and vertical deflection signals to drive the deflection system in response to the means for adjusting lines per field or lines per frame displayed.

DESCRIPTION OF THE INVENTION

Generally, one must display frames at the same rate as that transmitted, or the frames must be dropped or repeated. Since dropping or adding frames is unacceptable, a reasonable way for a TV receiver to track the incoming frames must be identified. Given the number of ATSC picture formats, this becomes difficult for a TV deflection system optimized to work over a narrow range of frequencies.

Adjusting the lines per field displayed offers a way to preserve the horizontal line rate as a constant, while only slightly varying the vertical rate, when used with a display format converter for multiple picture frame decoding formats. The variation of vertical rate permitted by the inventive method is sufficient to follow all frame rate frequencies between the receiver versus transmitter time-bases, and variations in output frame rates resulting from format conversions of various ATSC picture formats.

The basic elements of the inventive display frame rate adaptation, as may be used in TV receivers, includes a DC-coupled vertical deflection system, constant slope to vertical-deflection ramp, and a display output field of more horizontal lines to slow the average frame rate or a display output field of less horizontal lines to increase the average frame rate. The number of horizontal lines to be dropped or added are simply not displayed on the picture raster since they occur during the vertical blanking interval.

Figure 2:
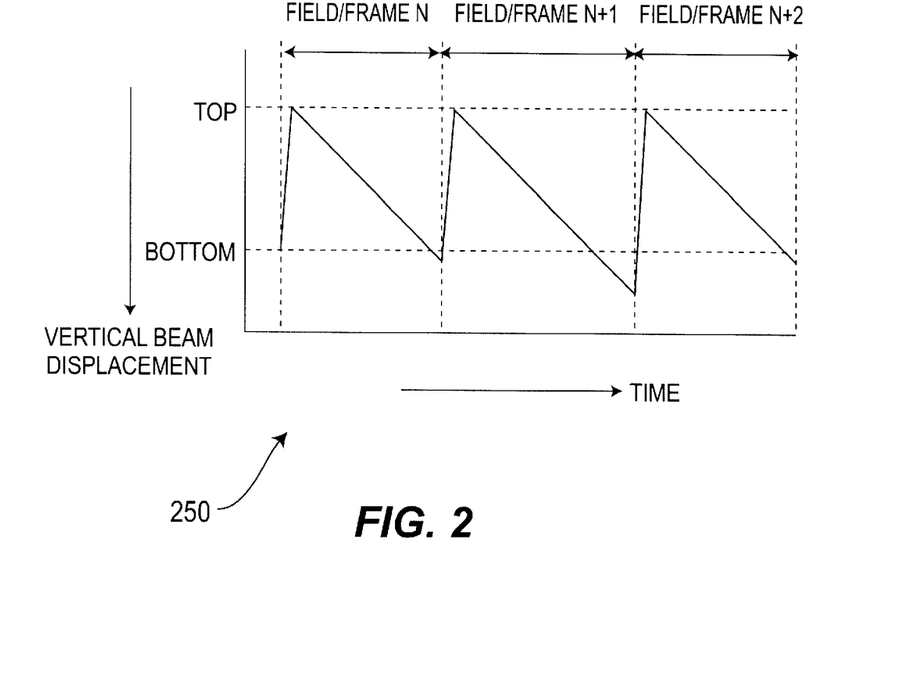
FIG. 2 illustrates schematically the relationship between varying the number of lines displayed in the raster output and DC coupled and constant slope vertical deflection.

The interplay of the above elements is illustrated graphically in FIG. 2 where portions of the ramps corresponding to TOP represent the top of the pictures, e.g., line 1, on successive frames, and the "Bottom" represents the bottom of active displayed lines. Portions of the ramp below "Bottom" represent non-active, i.e., non-displayable, lines, while the portion between TOP and BOTTOM represents active, i.e., displayable, lines. In this example, let the total number of active (displayable) and non-active (non-displayable) lines per frame be as follows: frame N has M+1 horizontal lines, frame N+1 has M+2 horizontal lines, and frame N+2 has M+1 horizontal lines. The relative number of M+1 frames versus M+2 frames controls the overall frame rate as averaged out over time. As time increases, the average frame rate becomes arbitrarily accurate. The only requirement is that the system must dither between an instantaneous frame rate that is lower than nominal and an instantaneous frame rate that is higher than nominal. Generally, dithering needs only to vary the number of horizontal lines from frame to frame in a progressive display system or field to field in an interlaced system by no more than one or two. From a practical standpoint, there may be non-displayable lines above TOP, but this is not important for the purposes of this example.

FIG. 2 shows that the average value of vertical displacement varies from frame to frame, as the displayed scan lines are dropped or added from frame to frame. An AC coupled vertical deflection system will tend to seek an average vertical displacement such that the number of lines above TOP and below BOTTOM are equal. This has the effect of changing the vertical position of the first and following lines of active display and the picture will tend to move up and down as these average levels change. A DC coupled deflection system, on the other hand, will enforce the vertical position of the first line displayed, keeping it at the TOP as a reference, and thus, the picture remains anchored to a specific position on the CRT face. A constant slope of the vertical ramp anchors the vertical position of the last displayable line at BOTTOM.

Since the DC coupled deflection anchors the first line at the TOP and the constant slope anchors the last displayable line at BOTTOM, then one may add lines below BOTTOM without affecting displayed (active) picture size or position. Also, the image is displayed with spatial consistency and only the frame rate is affected.

Figure 3A:
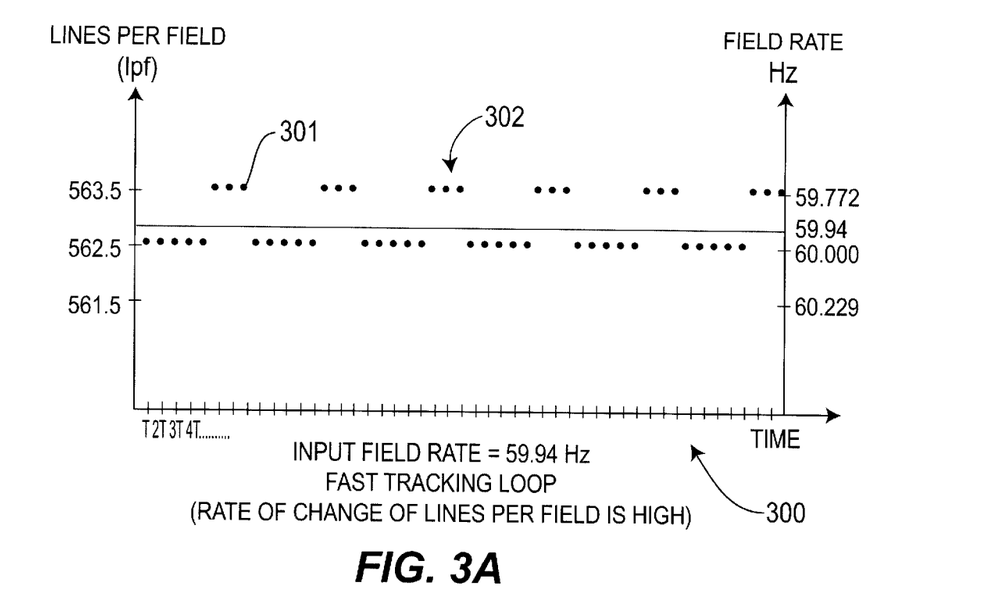
FIG. 3A is a schematic diagram illustrating an adaptation of the lines per field displayed with a relatively high rate of change of lines per field.

Consider the case where the raster generator 105 is configured for a nominal field rate of 60 Hz at 562.5 lines per field. FIG. 3A shows the situation where the input video has a field rate of 59.94 Hz. Since the system clock of the raster generator 105 is constant, the number of lines per field 301 is varied as needed to create an average output field rate of 59.94 Hz. In this particular example, it requires every 3 out of 8 fields 302 to have 563.5 lines instead of the nominal 562.5 lines.

Figure 3B:
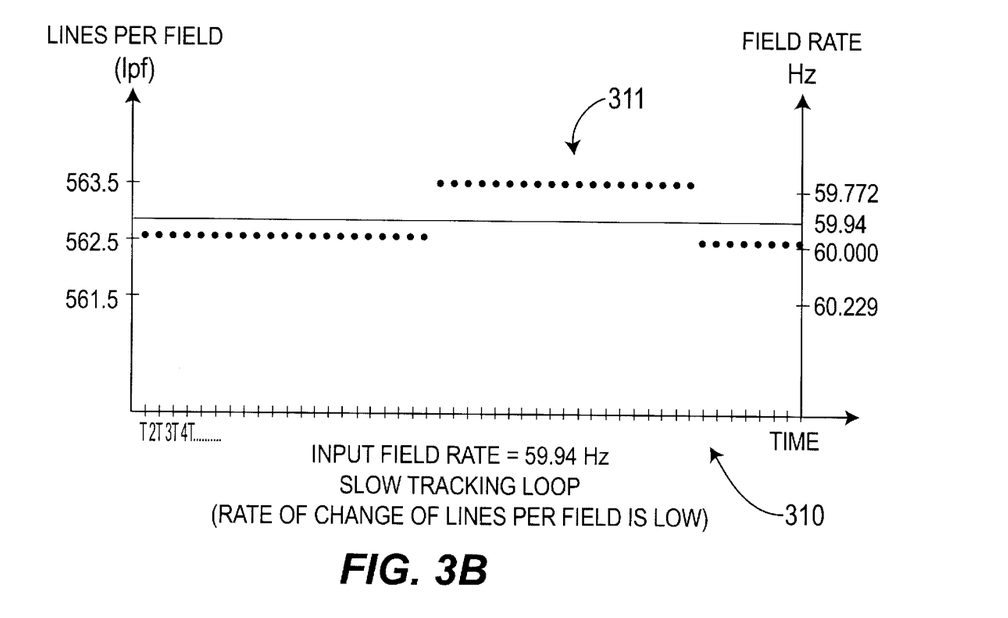
FIG. 3B is a schematic diagram illustrating an adaptation of the lines per field displayed with a relatively low rate of change of lines per field.

It is important to consider the dynamics of the tracking loop that controls the number of Lines Per Field in the output raster. The loop response may be fast or slow. The graph 300 of FIG. 3A shows the case where the tracking loop is made fast by maintaining the Average Field Rate over a relatively short time interval. The graph 310 of FIG. 3B shows a slower tracking loop, where the Average Field Rate is maintained over a longer period of time, with 19 out of 40 fields 311 having 563.5 lines per field lpf instead of the nominal 562.5.

Figure 4:
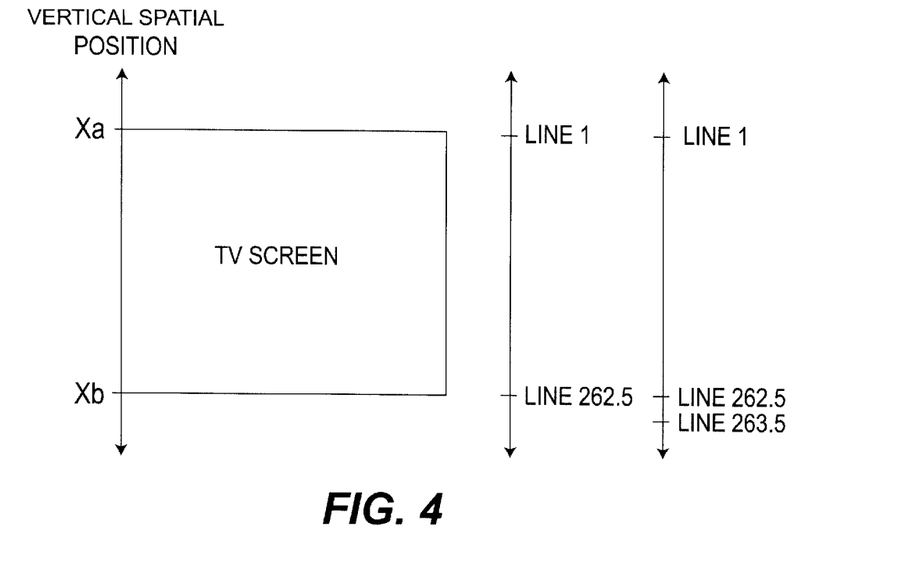
FIG. 4 illustrates vertical spatial positioning of horizontal raster lines.

This dynamic variation of the value of lines per field lpf imposes some constraints on the vertical deflection processing. The standard approach to vertical deflection system design in systems with adjustments of lines per field is to impose a DC coupling and Constant Slope Ramp. The DC coupling requirement ensures that the first line of video always starts at the same vertical position on the TV screen. As illustrated in the schematic 400 of FIG. 4, where Line1 is shown at the vertical position, Xa, and point Xb indicates the bottom of the TV screen. In a system with DC coupled vertical, Line1 always occurs at point Xa. The Constant Slope requirement ensures that Line 562.5 will always occur at position Xb, regardless of the number of lines in the output raster.

Figure 5:
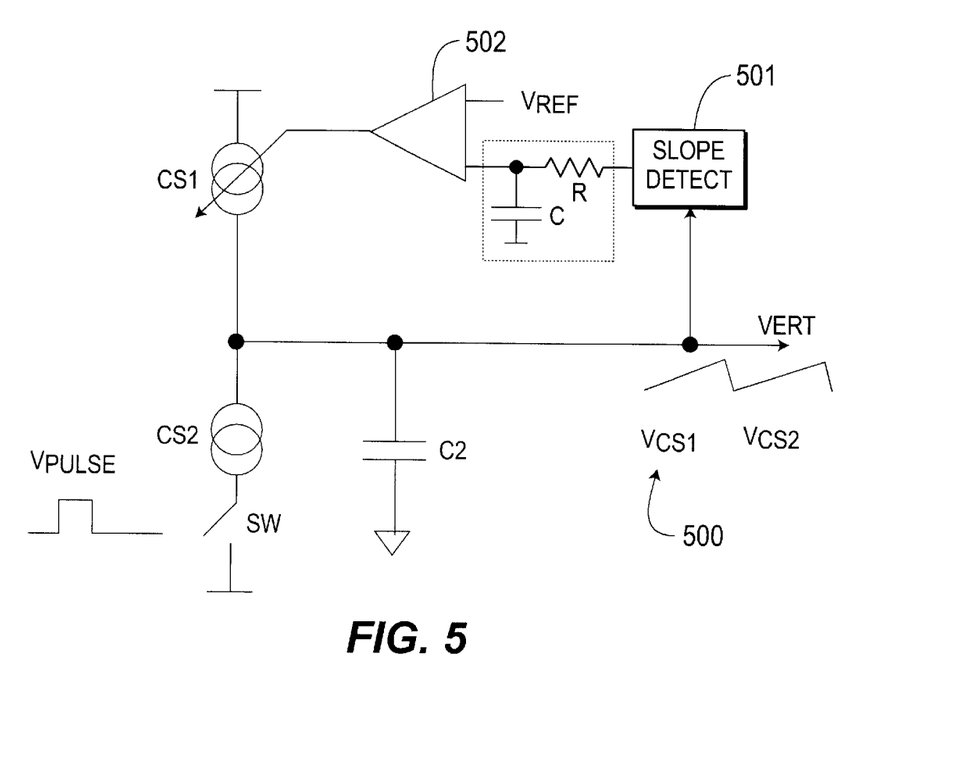
FIG. 5 is a schematic diagram of a constant slope vertical ramp Generator.

FIG. 5 shows a schematic diagram of an exemplary constant slope vertical deflection signal Vert generator. The vertical ramp deflection voltage Vert includes a vertical trace voltage slope VCS1 and a vertical retrace voltage slope VCS2. With switch SW open, as shown, part of the vertical deflection voltage Vert is fed back to a slope detector 501 which outputs across a resistor R and capacitor C network to a difference amplifier comparing the vertical deflection voltage Vert to a reference voltage Vref. The operating current level of constant current source CS1 is varied by the output of the difference amplifier 502 to charge capacitor C2 and provide the vertical ramp trace voltage Vcs1. When switch SW is closed, current source CS1 is ulled to current source CS2 which causes the charge on capacitor C2 to generate retrace voltage VCS2. Constant slope vertical deflection generators are known to those skilled in the art. It is noted that vertical tracking rate is influenced by the time constant of the RC network coupled between the output of the slope detector 501 and input to the difference amplifier 502.

The inventive display frame rate adaptation can be applied in an audio/video A/V decoder board designed to decode and display digital audio and video from digital satellite systems DSS and ATSC terrestrial transmissions. The analog video provided by the A/V decoder board is output from a digital-to-analog D/A converter that is clocked at a fixed frequency, whose maximum is 81 MHz. One pixel is output at each cycle of this clock. Every picture to be displayed will be up-sampled, where necessary, to 1920 active pixels per horizontal line. The number of inactive pixels per line can be fixed to a number greater than 480 for a total of 2400 pixels per line. The number of active lines, when the display is interlaced, is 1080 at 29.97 frames per second (Fps) or 30 Fps. The number of active lines when the display is progressive is 540 at 59.94 Fps or 60 Fps.

Figure 6:
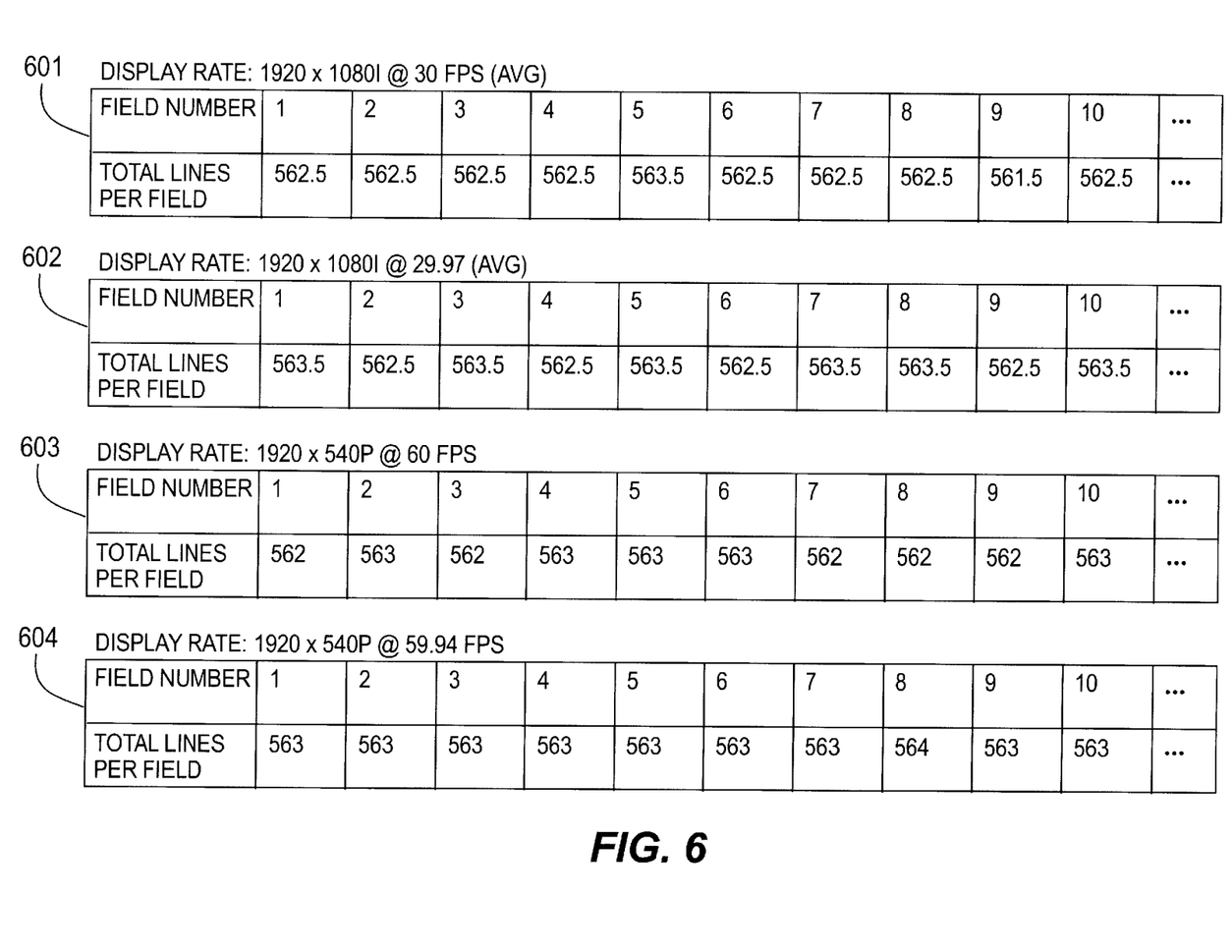
FIG. 6 is a table of examples illustrating lines per field adjusted to synchronize a display frame rate with a decoded frame rate.

The four examples in the tables of FIG. 6 show how the number of lines displayed on a raster may be slightly increased or decreased on a field-by-field or frame-by-frame basis to achieve a different display frame rate. In a first case 601 of 1920 pixels per line and 1080 interlaced horizontal lines, for every 10 fields 562.5 lines are displayed during fields 1-4, 6-8 and 10, one additional scan line is displayed during field 5 and one less scan line is displayed during field 9 to provide an average field rate of 30 frames per second (fps) 601. In the second case 602 of 1920 pixels per line and 1080I interlaced horizontal lines, for every 10 fields 563.5 scan lines are displayed during fields 1, 3, 5, 7-8 and 10 and one less scan line is displayed during fields 2, 4, 6 and 9 to provide an average field rate of 29.97 fps.

In a first case 603 of 1920 pixels per lines and 540P (progressive) horizontal lines, for every 10 fields 562 scan lines are displayed during fields 1, 3 and 7-9 and one additional scan line less is displayed during fields 2,4-6 and 10 to provide an average field rate of 60 fps. In a second case 604 of 1920 pixels per line and 540P progressive horizontal lines, for every 10 fields 563 scan lines are displayed during fields 1-7 and 9-10 and one additional scan line is displayed during field 8 to obtain an average frame rate of 59.94 fps.

Implementation of the inventive display frame rate adaptation is illustrated with detailed synchronization and timing diagrams for different display and picture formats. These diagrams demonstrate that decreasing the number of display lines scanned, following completion of prior active picture lines, requires initiating the vertical flyback pulse earlier in the vertical blanking interval between frames of active picture lines. Increasing the number of display lines scanned, following completion of prior active picture lines, requires initiating the vertical flyback pulse later in the vertical blanking interval between frames of active picture lines.

Figure 7:
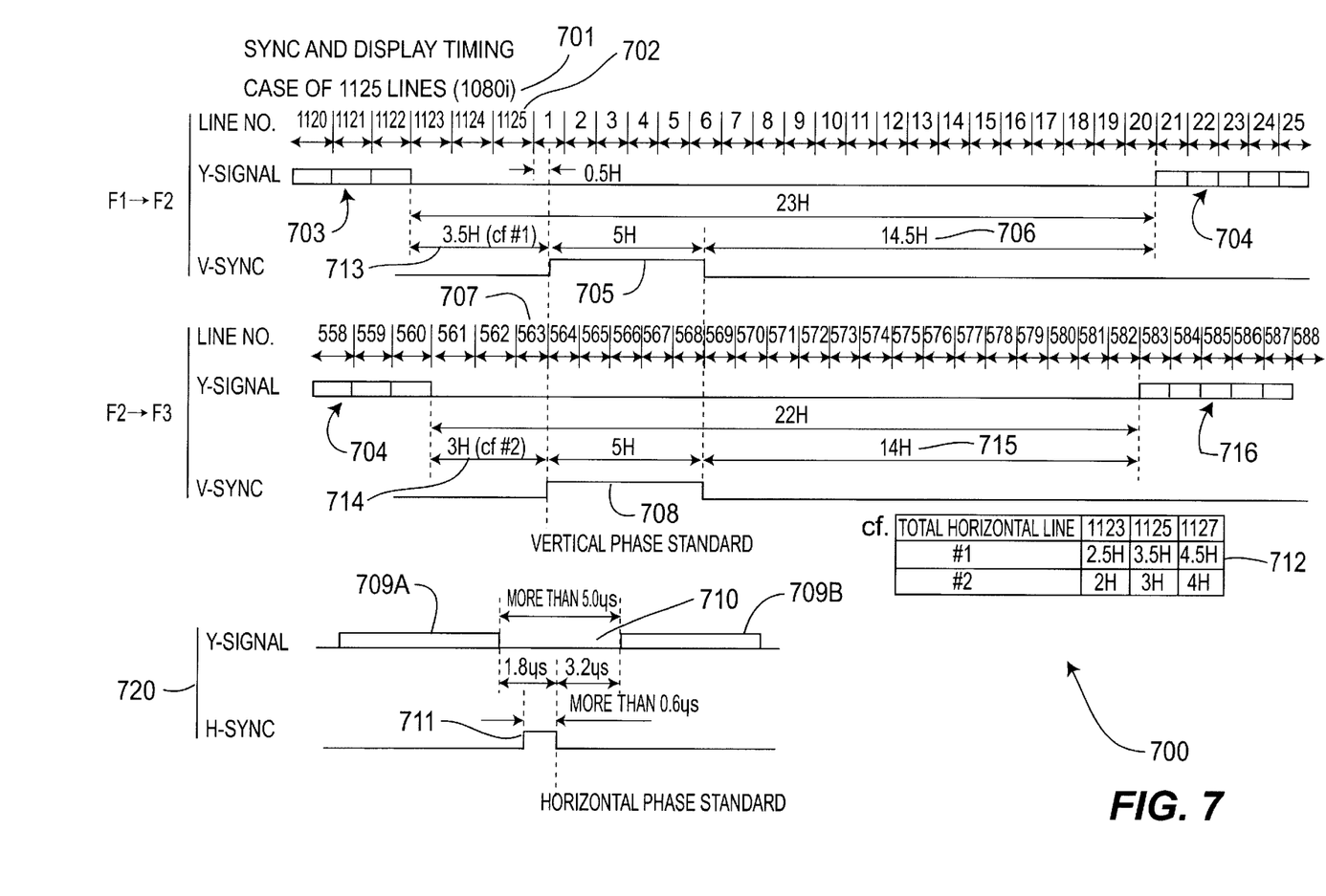
FIG. 7 shows synchronization and display timing diagrams for a case of 1125 display lines and 1080I interlaced picture lines.

FIG. 7 details synchronization and timing adjustment to a display format of 1125 display lines for 1080I interlaced picture lines. As shown by the top synchronization and timing diagram F1-F2 illustrating transition from a given field of Y-signal picture lines 703 to a next field of Y-signal picture lines 704, active Y-signal picture lines 703 end with display scan line 1122, and 23 horizontal line periods 23 H of vertical blanking with inactive Y-signal picture lines follow. Upon completion of vertical blanking the next field of Y-signal picture lines 704 begins with display scan line 21 of the next display frame scanning. The vertical synchronization waveform V-sync initiates flyback with a leading edge of flyback pulse 705 offset from the final display scan line 1125 by ½ a horizontal scan line period, 0.5 H, or a total of 3.5 H horizontal line periods 713 from the end of display scan line 1122. After 5 H horizontal line periods of the flyback pulse 705, vertical blanking continues for 14.5 H horizontal display line periods 706 until the next active Y-signal picture lines 704 begin.

During transition F2-F3 from the next field of Y-signal picture lines 704 to a succeeding field of Y-signal picture lines 716, vertical blanking coincides with display scan lines 561–563 of the prior field of display lines and continues for 3 H horizontal line periods 714, until a vertical flyback pulse 708 is initiated coincident with display line 564 and continued for 5 H horizontal line periods. Vertical blanking is continued for 14 H horizontal line periods 715 after the flyback pulse 708.

Referring to the bottom timing diagram 720, during a horizontal blanking interval 710 between Y-signal picture lines, such as exemplary picture lines 709A and 709B shown, the leading edge of a horizontal flyback pulse 711 is initiated no more than 1.2 microseconds (1.8 less.0.6 shown in the diagram) from the trailing edge of the prior Y-signal picture line 709A.

Adjustment of the synchronization and timing to accommodate the inventive display frame rate adjustment is effected by initiating the vertical flyback pulses 705, 708 earlier to increase the display frame rate and facilitate a decrease in the display lines from 1125 to 1123. Increasing the display lines from 1125 to 1127 requires delaying the initiation of vertical flyback pulses 705 and 708, as shown in block 712. In the case of 1123 display lines, vertical flyback pulses 705 and 708 are initiated 2.5 H and 2 H horizontal periods, respectively, after the last picture line from the prior Y-signal picture lines, 703 and 704. In the case of 1127 display lines, vertical flyback pulses 705 and 708 are initiated 4.5 H and 4 H horizontal line periods, respectively, after the last picture line from the prior Y-signal picture lines, 703 and 704. In summary, reducing the display lines from 1125 to 1123 requires initiating the leading edges of the flyback pulses one horizontal period 1 H earlier, and increasing the display lines from 1125 to 1127 requires delaying the leading edge of the vertical flyback pulses 705 and 708 by one horizontal line period 1 H.

Figure 8:
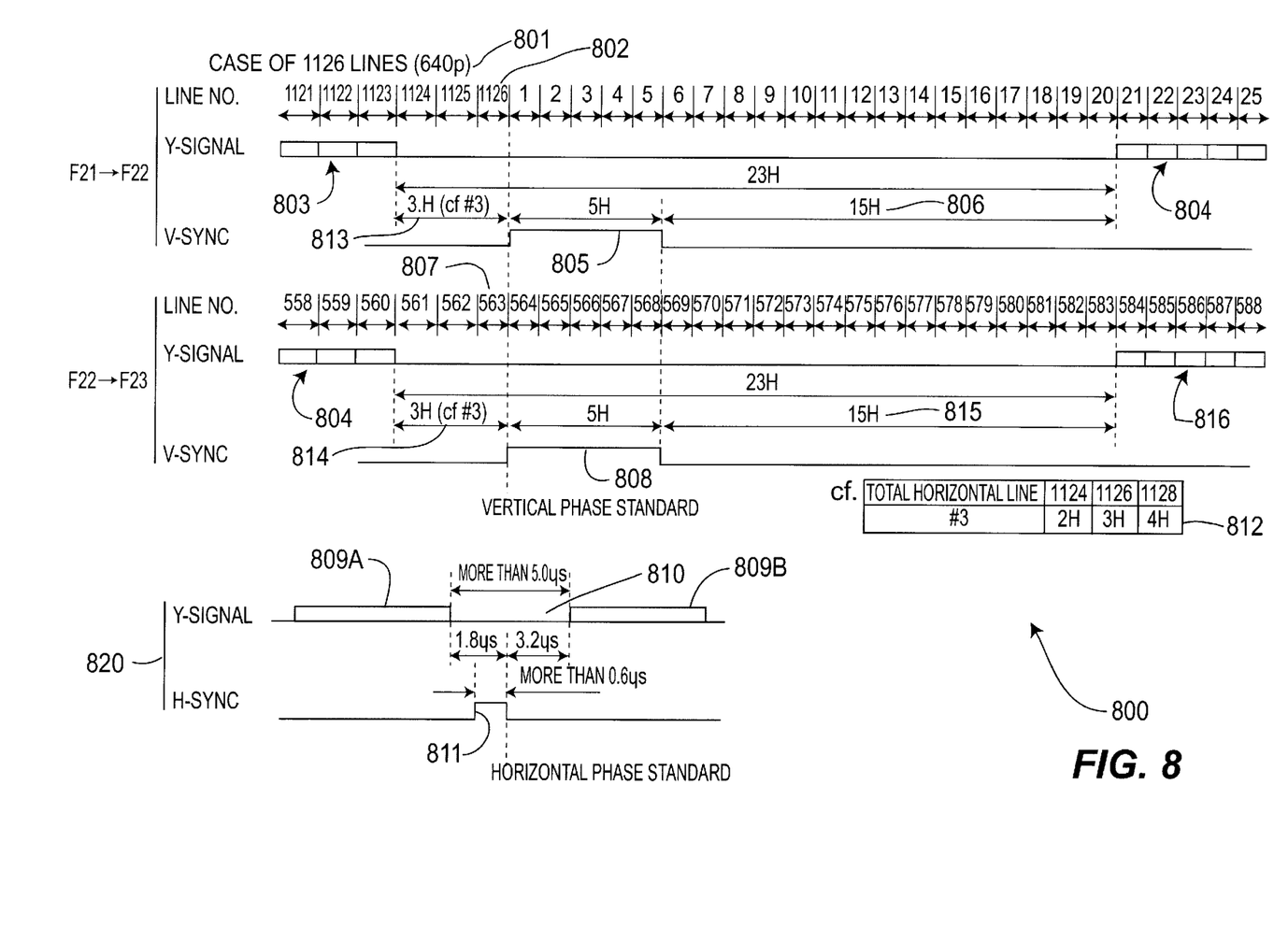
FIG. 8 shows synchronization and display timing diagrams for a case of 1126 display lines for two successive frames of 540P progressive picture lines.

FIG. 8 details synchronization and timing adjustment to a display and picture format of 1126 display lines for 2 successive frames of 540P progressive picture lines. Although only 563 display lines are generated for each frame of active picture lines, 1126 display lines for two frames of 540P picture lines are depicted to readily permit comparison to the synchronization and timing diagrams of FIG. 7.

As shown by the top synchronization and timing diagram F21-F22 illustrating transition from a given field of Y-signal picture lines 803 to a next field of Y-signal picture lines 804, active Y-signal picture lines 803 end with display scan line 1123, and 23 horizontal line periods 23 H of vertical blanking with inactive Y-signal picture lines follows. Upon completion of vertical blanking the next field of Y-signal picture lines 804 begins with display scan line 21 of the next display frame scanning. The vertical synchronization waveform Vsync initiates flyback with a leading edge of flyback pulse 805 with initial display scan line 1 of the display frame for the next active Y-signal picture lines, or a total of 3 H horizontal line periods 813 from the end of display scan line 1123. After 5 H horizontal line periods of the flyback pulse 805, vertical blanking continues for 15 H horizontal display line periods 806 until the next active Y-signal picture lines 804 begin.

During transition F22-F23 from the next field of Y-signal picture lines 804 to a succeeding field of Y-signal picture lines 816, vertical blanking coincides with display scan lines 561–563 of the prior field of display lines and continues for 3 H horizontal line periods 814, until a vertical flyback pulse 808 is initiated coincident with display line 564 and continued for 5 H horizontal line periods. Vertical blanking is continued for 14 H horizontal line periods 815 after the flyback pulse 808.

Referring to the bottom timing diagram 820, during a horizontal blanking interval 810 between Y-signal picture lines, such as exemplary picture lines 809A and 809B shown, the leading edge of a horizontal flyback pulse 811 is initiated no more than 1.2 microseconds (1.8 less 0.6 shown in the diagram) from the trailing edge of the prior Y-signal picture line 809A.

Adjustment of the synchronization and timing to accommodate the inventive display frame rate adjustment is effected by initiating the vertical flyback pulses 805, 808 earlier to increase the display frame rate and facilitate a decrease in the display lines from 1126 to 1124. Increasing the display lines from 1126 to 1128 requires delaying initiation of vertical flyback pulses 805 and 808, see block 812. In the case of 1124 display lines, vertical flyback pulses 805 and 808 are initiated 2 H horizontal line periods after the last picture line from the prior Y-signal picture lines, 803 and 804. In the case of 1128 display lines, vertical flyback pulses 805 and 808 are initiated 4 H horizontal line periods after the last picture line from the prior Y-signal picture lines, 803 and 804. In summary, reducing the display lines from 1126 to 1124 requires initiating the leading edges of the flyback pulses one horizontal period 1 H earlier, and increasing the display lines from 1126 to 1128 requires delaying the leading edge of the vertical flyback pulses 805 and 808 by one horizontal line period 1 H.

Figure 9:
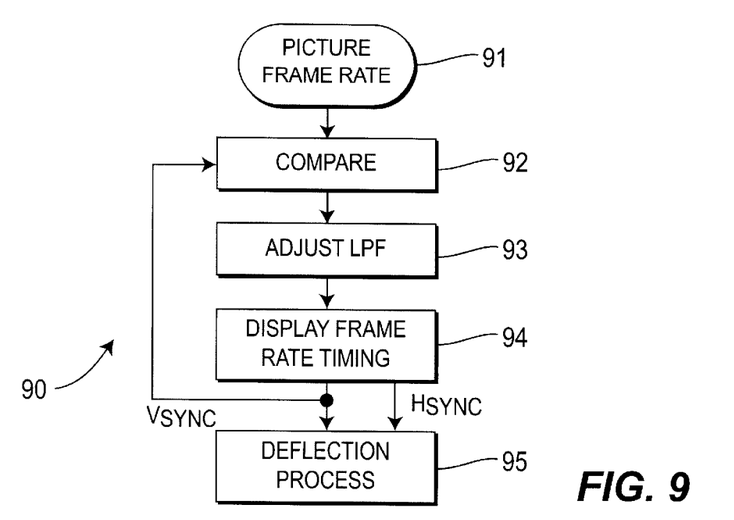
FIG. 9 is a chart diagram of essential steps for the inventive adapting of display frame rate to incoming picture frame rate.

Basic steps for implementing the inventive display frame rate adaptation are charted 90 in FIG. 9. The frame rate of the received picture signal 91 is compared 92 to the receiver's display frame rate 94. In response to any difference between the picture signal frame rate and display frame rate, the lines per field or lines per frame lpf displayed is adjusted 93. The adjusted lines per field changes the display frame rate timing 94, which outputs a signal indicative of display frame rate to drive a display control process 95, such as a deflection process 106. The display frame rate signal is continually fed back for repeated comparison to the picture signal frame rate until the difference between the two is negligible or zero.

Figure 10:
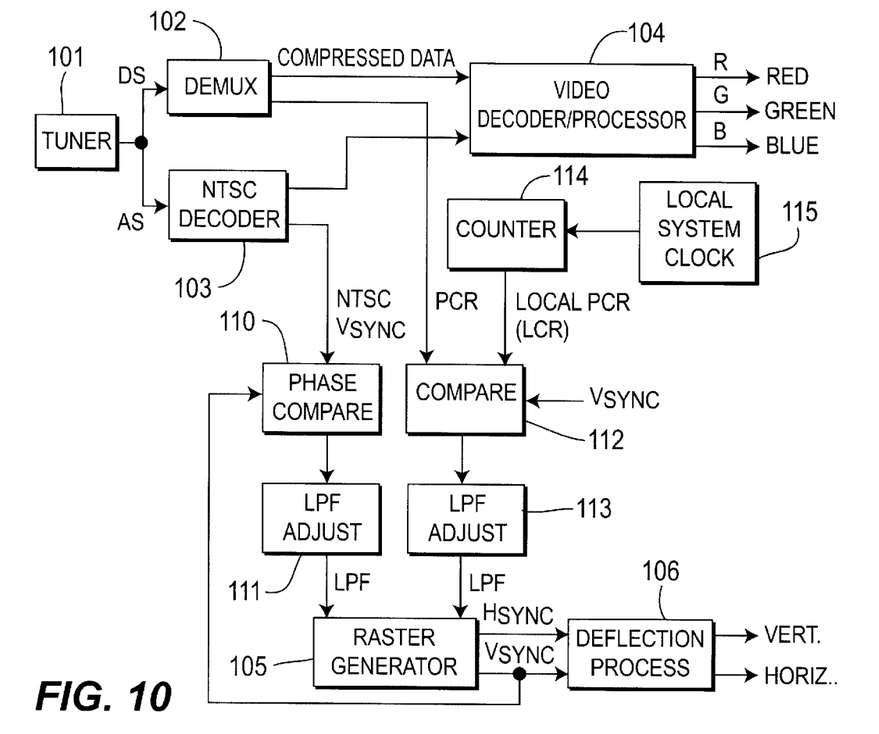
FIG. 10 is the system block diagram of FIG. 1 modified to include features for implementing the inventive display frame rate adaptation.

An exemplary receiver 100 for implementing the inventive display frame rate adaptation is shown in FIG. 10. Although the exemplary receiver 100 shown has dual signal processing paths, a path for analog signal processing and a path for digital signal processing, the inventive display frame rate adaptation can be practice with an analog only or digital only receiver.

In the receiver 100, the raster generator 105 takes the lines per field (lpf) parameter as an input and provides appropriate vertical and horizontal synchronization signals Vert, Horiz. The calculation of lines per field lpf is done on a field by field basis. Since vertical synchronization Vsync is generated every lpf lines in the raster generator 104, adjusting the lpf as needed has the effect of initiating the leading edge of the flyback pulse earlier or later, as discussed for FIG. 7 and 8.

For analog signals AS in the NTSC format, the NTSC decoder 103 also outputs an NTSC-Vsync signal, in a format of 60 fields per second, which has its phase compared 110 with the phase of a vertical synchronization signal Vsync, in a format of 60 frames per second, from the raster generator 105. The lines per field lpf input to the raster generator 105 is adjusted 111 until the phase error between the NTSC-Vsync signal and the Vsync signal from the raster generator 105 is negligible or zero. A phase error of zero is then a condition for frame synchronization between the display frame rate and the video signal's transmitted frame rate.

For digital signals DS in the MPEG-2 format, the de-multiplexor DEMUX 102 delivers both compressed data to the video/decoder processor 104 and a program clock reference PCR to a comparator 112. The program clock reference PCR is a timestamp, i.e., timing reference, that is inserted by an MPEG-2 encoder into the transport stream to aid the video decoder 104 in the recovering and tracking the encoder clock on the transmit side of the communications link. The PCR is compared to a local program clock reference LCR output from a counter 114 driven by a local system clock 115. Note that a PCR is a sample of the output of a counter driver by an encoding system clock at the transmission side.

The lines per field lpf is adjusted 113 in response to a comparison 112 of the LCR and PCR that is synchronous with the vertical synchronous signal Vsync output by the raster generator 104. The lpf is adjusted until the difference between LCR and PCR approaches or is substantially zero. This is quite different from a conventional clock recovery scheme where output from the comparator 112 is used to adjust the local system clock frequency until the difference between the PCR and LCR is negligible or substantially zero.

Variations, combinations and permutations of the above as would occur to one of ordinary skill in the art are included in the scope and spirit of the invention.

What is claimed:

1. A method for adapting display frame rate in a receiver to a picture frame rate of a received signal, comprising the steps of:

comparing a picture frame rate of a received signal with a display frame f a receiver;

adjusting lines per field or lines per frame displayed in response to said comparing step; and generating a display frame rate control signal for said receiver in response to said adjusting step.

2. The method according to claim 1, wherein for an analog signal format of said received signal said comparing step comprises comparing a phase of a vertical synchronization signal indicative of said picture signal frame rate and phase of a vertical synchronization signal as said display frame rate control signal.

3. The method according to claim 2, wherein said step of adjusting lines per field is repeated so that said phases approach each other.

4. The method according to claim 1, wherein for a digital signal format of said received signal said comparing step comprises comparing a timing reference for said received signal with a local timing reference for said receiver.

5. The method according to claim 1, wherein said comparing step comprises comparing a program clock reference for said received signal with a local program clock reference for said receiver.

6. The method according to claim 4, wherein said adjusting step is repeated so that said timing reference and said local timing reference approach each other.

7. The method according to claim 1, further comprising the step of in response to said display frame rate control signal generating a vertical deflection signal for a display tube on which an image represented by said received signal is to be viewed.

8. The method according to claim 7, wherein said generating step comprises generating a constant slope vertical deflection signal for said received signal that is DC coupled to said display tube.

9. The method according to claim 1, wherein said adjusting step comprises adding to said lines per field displayed to decrease an average of said display frame rate and subtracting from said lines per field to increase an average of said display frame rate.

10. The method according to claim 1, wherein said receiver comprises a DC coupled and constant slope ramp vertical deflection system.

11. The method according to claim 1, wherein said step of adjusting comprises varying lines per field displayed for an average display frame rate in frames per second selected from the group consisting of 29.97, 30, 59.94 and 60.

12. The method according to claim 1, wherein for 1080 interlaced picture lines said adjusting step comprises varying the lines per field displayed to be one of selected from the group consisting of 1123, 1125 and 1127.

13. The method according to claim 1, wherein for two successive frames of 540 progressive picture lines said adjusting step comprises varying the lines per field displayed to be one of selected from the group consisting of 1124, 1126 and 1128.

14. A receiver for adapting a display frame rate to a picture frame rate of a received signal comprising:

a DC coupled and constant slope ramp vertical deflection system;

a signal decoder for a received signal that provides a first signal for video processing to drive a display tube and a second signal indicative of a picture frame rate of said received signal;

a comparator for comparing said second signal with a timing signal indicative of a display frame rate for said receiver;

means for adjusting lines per field or lines per frame displayed by said receiver in response to said comparator; and a raster generator for providing horizontal and vertical deflection signals to drive said deflection system in response to said means for adjusting lines per field or lines per frame displayed.

15. The receiver according to claim 14, wherein said signal decoder is for decoding an analog form of said received signal and said second signal is a vertical synchronization signal.

16. The receiver according to claim 14, wherein said signal decoder is a de-multiplexor for a digital form of said received signal and said second signal is a timing reference signal.

17. The receiver according to claim 14, wherein said signal decoder comprises both an analog signal decoder and an digital signal de-multiplexor, said second signal being a vertical synchronization signal when output by said analog signal decoder and a program clock reference when output by said de-multiplexor.

18. The receiver according to claim 14, wherein for an analog form of said received signal said comparator is a phase comparator for comparing said second signal that is a vertical synchronization signal to said timing signal that is a second vertical synchronization signal.

19. The receiver according to claim 14, wherein for a digital form of said received signal said comparator compares said second signal that is a program clock reference for said received signal to said timing signal that is a local program clock reference.

20. The receiver according to claim 14, wherein for said received signal comprising 1080 interlaced picture lines said means for adjusting comprises varying said lines per field displayed to one of selected from the group consisting of 1123, 1125, and 1127.

21. The receiver according to claim 14, wherein for said received signal comprising two successive frames of 540 progressive picture lines per frame said means for adjusting comprises varying the lines per two frames displayed to one of selected from the group consisting of 1124, 1126 and 1128.

22. A receiver for adapting a display frame rate to a picture frame rate of a received signal comprising:

a DC coupled and constant slope ramp vertical deflection system;

an analog decoder for an analog received signal that provides a video signal for video processing to drive a display tube and a first vertical synchronization signal for said analog received signal, a digital decoder for a digital received signal that provides a data signal for video decoding to drive said display tube and a first timing reference signal for said digital received signal;

a first comparator for comparing a phase of said vertical synchronization signal to a phase of a second vertical synchronization signal for driving said deflection system;

a second comparator for comparing a said first timing reference signal to a second timing reference signal for said receiver;

first means for adjusting lines per field displayed by said receiver in response to said first comparator;

second means for adjusting lines per field displayed by said receiver in response to said second comparator; and a raster generator for providing horizontal and vertical deflection signals to drive said deflection system in response to said first or second means for adjusting lines per field displayed.

* * * * *